Feb. 2, 1965 W. W. ASHBY 3,168,199
PALLET STORAGE RACK ASSEMBLY
Filed Aug. 30, 1962

INVENTOR.
WAYNE W. ASHBY
BY
ATTORNEY

United States Patent Office 3,168,199
Patented Feb. 2, 1965

3,168,199
PALLET STORAGE RACK ASSEMBLY
Wayne W. Ashby, 6330 Carmelita Ave., Bell, Calif.
Filed Aug. 30, 1962, Ser. No. 220,392
7 Claims. (Cl. 211—150)

This invention relates to the storage of loaded pallets and more particularly to an improved rack assembly for installation in storage rooms featuring provision for storing tiers of loaded pallets with upper pallets supported from the rack and from swing bars pivotally connected to one side of the storage aisle.

Smaller units of packaged goods are commonly handled and stored today in stacked condition on reusable pallets and in quantities suitable for convenient handling by motorized forked trucks. Since the goods ordinarily handled cannot be stacked above a rather limited height without risk of crushing the containers or overturning, there are limits to which palleted goods can be stacked in the storage space. In many instances it is practical to stack one loaded pallet on a lower one but it is not feasible to increase the tier height of most items beyond two pallets without serious risk.

To achieve more economical utilization of storage space, various expedients have been proposed heretofore involving the use of rack assemblies constructed and functioning in accordance with various principles and by the use of which some or all of the loaded pallets are supported by the rack assemblies thereby making more efficient use of storage space and avoiding crushing of the stored articles. Certain of these rack assemblies includes frameworks arranged along the sides of aisles of loaded pallets and having shelves or brackets projecting toward one another at suitably arranged horizontal levels and engageable with the lateral edges of the pallets. Such rack assemblies are subject to the serious objection that the backets obstruct the aisles and require the pallets to be in rather precise elevated position and expert manipulation of the fork lift trucks while moving the pallets into or out of storage position. Support of the loaded pallet slightly above its proper storing height while being moved along the storing aisle subjects the equipment as well as the stack of goods on the pallet to unnecessary hazards and risks.

Another rack proposal involves erecting stringers across the aisle and securing their ends to the racks by fastener devices or other means and using these stringers to support a group of loaded pallets in side-by-side relation. This expedient is feasible only where goods are to be stored for prolonged periods thereby enabling the labor and cost involved in erecting the stringers to be amortized over a long period of time. The elevation of the stringers into their assembled positions is laborious and is dangerous for the workmen as well as for merchandise in the vicinity. A variant of this proposal involves the construction of shelving units pivoted to one side of the aisle and pivotal upwardly against the side of the aisle when not in use. Such shelving requires stationary supports projecting into the aisle and underlying the lateral edges of the shelves to engage them as the shelves are hinged downwardly into their operating positions. The pivotal movement of the shelves to their upper inactive position involves the risk that the tool used for this purpose will become disengaged as the shelves approach their upper position permitting the shelves to fall and cause injury to the equipment or to the workman. Additionally, some means must be provided for locking the shelves in their upper position and for disengaging the locking means before lowering the shelves to their operating position. Both the self-supporting brackets and the shelves constrict and interfere with the use of the aisle.

To obviate the foregoing and other shortcomings of prior proposals, there is provided by the present invention an exceedingly simple, rugged, flexible and easily operated pallet-supporting rack assembly. In brief, these assemblies include a plurality of identical rigid but compact upright frames arranged parallel to one another in the storage space in a manner providing aisles just sufficiently wide to store rows of tiers of loaded pallets. These tiers may extend from the floor to the ceiling of the storage space, the upper pallet in each tier preferably being supported on a plurality of lightweight, simply constructed swing bars captively assembled to the frame on one side of the aisle. The pivot connection of these bars to the rack has sufficient lost motion to permit lateral swinging of the bars as necessary for their free ends to be hooked over and disengaged from the horizontal supporting member carried by the frame on the opposite side of the aisle. When not in use, the swing bars are disengaged and pivot downwardly by gravity to lie suspended in a vertical plane coincident with the plane of the supporting frame. Accordingly, neither frame includes any member projecting into the aisle with the result that the aisle, when empty, remains free and unobstructed for its full length. The bars are individually engaged or disengaged with respect to their load supporting position, and are swung upwardly into operating position only when need for their use arises. These swing bars include means normally holding them captively assembled to the frames and may include provision for their disassembly when manipulated in the special manner required for this purpose. Desirably, the frames include outrigger means extending from one end and outwardly over the main access aisle to the pallet storage aisles and equipped with swing bars usable for supporting loaded pallets along the sides of the main aisles and out of the normal working space of the latter aisle. When not in use, the swing bars so employed hang by suspension and are slidable against one another to occupy a minimum of space close against the sides of the main aisle.

Accordingly, it is a primary object of the present invention to provide an improved rack assembly for use in storage spaces and greatly increasing the capacity, convenience and flexibility of use of the space in storing tiered pallets.

Another object of the invention is the provision of an improved rack assembly for increasing the capacity and efficiency of a storeroom in storing loaded pallets and featuring the use of simple, one-piece swing bar units normally hanging suspended at the sides of the storage aisles but supportable horizontally across these aisles to store an extra row of loaded pallets at the top of the room and out of contact with underlying pallets.

Another object of the invention is the provision of an improved flexible rack assembly for storerooms providing for the storage of rows of loaded pallets at least the upper ones of which are out of contact with underlying pallets and including provision for storing rows of loaded pallets along the opposite sides of the main access aisle opening into the lateral aisles.

These and other more specific objects will appear upon reading the following specification and claims and upon considering in connection therewith the attached drawings to which they relate.

Referring now to the drawings in which a preferred embodiment of the invention is illustrated.

Figure 1:
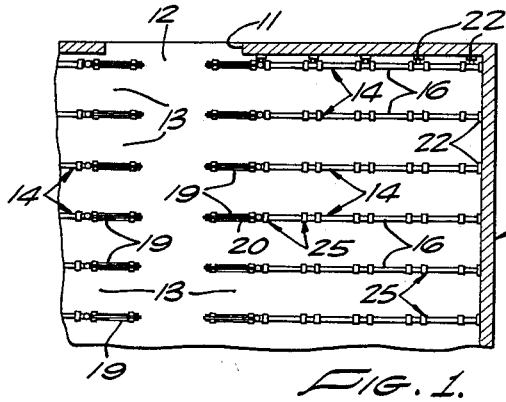
FIGURE 1 is a fragmentary schematic sectional view through the top of a storage room equipped with the rack assemblies of the present invention.
Figure 2:
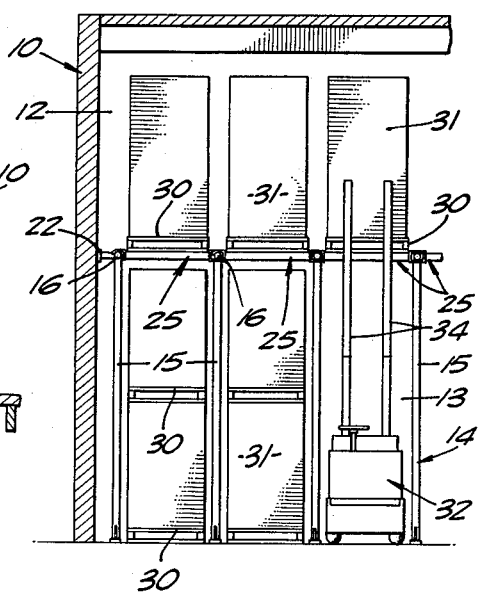
FIGURE 2 is a vertical sectional view looking into the entrance end of the lateral storage aisles and showing an upper pallet in the process of being stowed.
Figure 3:
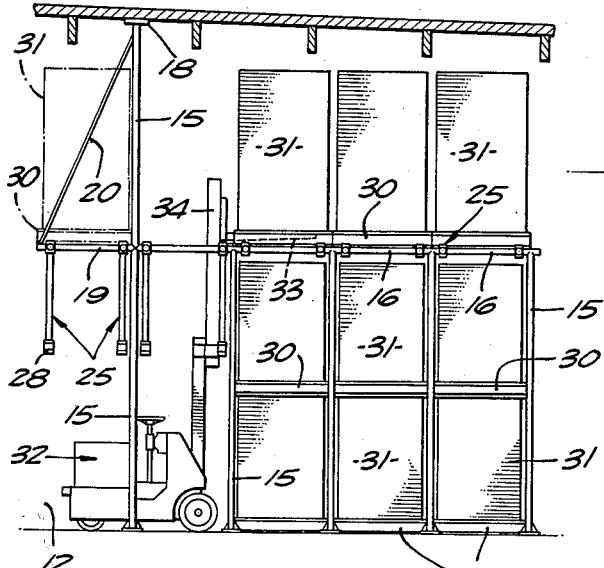
FIGURE 3 is a side view taken along one side of a lateral aisle.

Referring more particularly to FIGURES 1, 2 and 3, there is shown a preferred and typical installation of the invention rack assemblies in a conventional storage room. FIGURE 1 shows only one corner of the storage room, there being an entrance 11 to the room opening directly into a main access aisle 12 passing generally centrally between the adjacent ends of lateral storage aisles 13, 13 suitable for storing rowed tiers of loaded pallets.

Lateral aisles 13 are defined by elongated upright frames 14, 14 forming the principal component of the rack assemblies and extending parallel to one another the full length of the lateral aisles. As here shown, frames 14 are constructed from upright tubular members 15 rigidly secured to the floor of the room and interconnected by suitable cross bracing extending lengthwise of the aisles and represented by the horizontal members 16. The present showing includes but a single horizontal member 16 for each frame, but it will be understood that additional cross bracing is desirably employed. Frames 14 will be understood as including suitable anchorage means at intervals extending to the side walls and ceiling of the room and providing additional stability and anchorage for the frames. For example, from FIGURE 3 it will be noted that vertical members 15 along main aisle 12 are longer than some of the other vertical members and are anchored to the ceiling of the room, as by the flanged plates 18. Desirably, the inner or wall ends of horizontal members 16 are anchored to the room wall by suitable anchorage plates as those indicated at 22 in FIGURE 1. It is therefore clear that each of the rigid upright frames 14 is firmly anchored in place to either side of the aisles used to store the loaded pallets.

The outer ends of horizontal members 16 project into the main asile 12, as indicated at 19 in FIGURE 3, to provide support for at least one loaded pallet at the inlet to each lateral aisle and in the space overlying the normal working space of the main aisle. Suitable means, as for example the diagonal tie rods 20, are connected between the outer ends of horizontal members 19 and the room ceiling or the upper end of the upright frame member 15.

Figure 5:
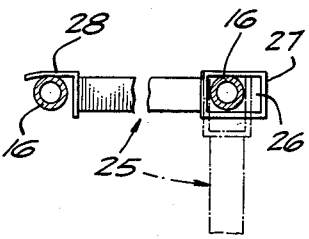
FIGURE 5 is a fragmentary side elevational view of the swing bar shown in FIGURE 4.
Figure 4:
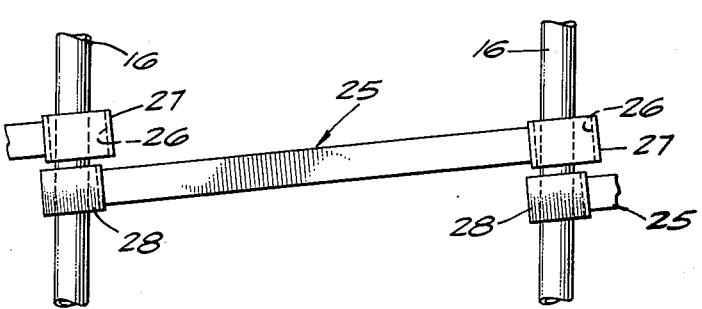
FIGURE 4 is a fragmentary top plan view on an enlarged scale looking downwardly upon adjacent swing bar units supported in operating position.

The swing bars employed to store pallets in the upper areas of the aisles form an important feature of the invention and will be best understood from FIGURES 2 to 5. These swing bars, designated generally 25, are here shown as formed from straight sections of tubular stock having an overall length somewhat greater than the width of aisles 13. As is best shown in FIGURES 4 and 5, one end of each swing bar is provided with an elongated transverse opening 26. Such an opening is conveniently formed by cutting a short section of tubular stock of rectangular cross section and welding one of its end walls to the end of the main body of the swing bar. The other or free end of the swing bar is provided with a notch or a hook member 28 welded or otherwise secured across the end of the tube and having its horizontal leg positioned to overlie the top of horizontal frame member 16. The latter members are threaded through openings 26 of the swing bars during the assembly operation and thereafter hold the swing bars permanently but pivotally assembled thereon for purposes which will be explained more fully presently. To be noted from FIGURE 5 is the fact that when the swing bars are supported horizontally across the aisles member 16 lies close to the main body end of opening 26. Likewise hook portion 28 has its vertical wall supported close to member 16 on the other side of the aisle. This provides assurance against lengthwise shifting of the swing bars sufficiently for hook 28 to become disengaged from member 16.

Normally and before storing pallets within room 10, all swing bars 25 except the pair at the innermost end of each aisle will be in their inoperative positions wherein they are suspended vertically in a common plane with frame 14 to which they are connected. Thus the dot-and-dash line showing of the swing bars 25 in FIGURE 5 shows that these bars lie vertically directly below horizontal members 16 with no portion projecting into aisle 13. Accordingly, the presence of the swing bar members interferes in no way with the use of the maximum width of aisles 13.

Storing of pallets 30 of conventional construction each stacked with goods, as indicated at 31, is accomplished in the usual manner by the aid of a fork lift truck 32. Such trucks are provided with a lifting fork 33 supported on an elevator 34 capable of lifting the fork 33 to the maximum storing height for the pallets. As herein shown, swing bars 25 are arranged to support an upper or third row of pallets above two underlying rows the upper one of which is supported on top of the lower row. However, it will be understood that if desired each horizontal row of pallets may be supported on a separate set of swing bars in the same manner as is the third row illustrated in the drawings.

The two lower rows of pallets are stacked in conventional manner by the aid of a fork lift truck. As each tier of these is completed, the third tier pallet and its load is elevated into position by the fork lift truck, the operator having first taken the precaution of placing a pair of swing bars in their load carrying position shown in FIGURE 4. Desirably the swing bars are erected before the underlying pallets are placed in storage and is accomplished by an operator employing a pole to swing the free end of an individual swing bar upwardly and laterally sufficiently for the hooked end 28 to bypass the associated member 16. After this member has been bypassed, the swing bar is swung back to a position generally crosswise of the aisle and is lowered until the hook 28 engages firmly against the upper side of member 16. Rectangular opening 26 at the pivoted end of the swing bars is sufficiently large to permit the requisite swinging movement of the bars without binding action.

It will be appreciated from the foregoing that the uppermost pallet 30 may be stored or withdrawn from storage on the swing bars irrespective of the presence or absence of underlying pallets. As a matter of fact, some users prefer to store the uppermost pallets first and thereafter to store the two underlying pallets.

Likewise, the use of the storage space along either side of aisle 12 is accomplished in the same manner described above after first taking the precaution of swinging swing bars 25 into position beneath each storage space. Only sufficient head space need be left above the main aisle to permit access to the pallets stored overhead and along either side of the main aisle.

Figure 6:
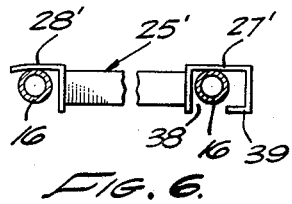
FIGURE 6 is a view similar to FIGURE 5 but showing a modified embodiment of the swing bar.

Referring to an alternate embodiment of the swing bars designated generally 25' in FIGURE 6, it is pointed out that the lost motion connector element 27' is substantially identical with the corresponding member 27 of FIGURES 1 to 5 with the exception that the lower side of this member adjacent the main body of the swing bar is cut away to provide an assembly opening 38 large enough to pass over frame member 16. This expedient permits the swing bars to be moved from place to place as needed and to be disassembled from and reassembled to frames 14 at any time this should become desirable. Guard lip 39 present on the outer lateral side of opening 38 safeguards against accidential disconnection of the swing bars from member 16. In other words, the presence of this guard member 39 requires that the swing bars be lifted and manipulated in the requisite manner to disassociate them from pipe 16.

While the particular pallet storage rack assembly herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A storage rack assembly for use in a warehouse to store loaded pallets in compactly arranged tiers with an upper pallet supported independently of an underlying pallet, said assembly comprising a pair of upright rigid frames arranged parallel to one another and supported on the floor of a storage room, means for anchoring said frames rigidly in place in the room and spaced apart sufficiently to form an asile permitting conventional pallets to be deposited and withdrawn from between adjacent pairs of said frames, displaceable cross bar means having a length spanning the distance between said adjacent pairs of frames and supported at their opposite ends by said frames in a horizontal position spaced above an underlying loaded pallet whereby said cross bar means and said frames are effective to support a loaded pallet independently of the presence or absence of underlying loaded pallets, said rigid frames including horizontal members rigid therewith, and said cross bar means being pivotally supported at one end by said horizontal members and being readily and individually displaceable when not in use to a vertical suspension position on one of said frame members along one side of the aisle between said pairs of frames.

2. A storage rack assembly as defined in claim 1 characterized in that one end of said cross bar means is provided with a downwardly opening hook means engageable over the top side of one of said horizontal members on one of said upright frames and being readily disengaged therefrom by an upwardly applied lifting force on said cross bar means, and the other end of said cross bar means having means normally holding the same loosely assembled to a horizontal member on an adjacent upright frame.

3. That improvement in storage rack assemblies for use in storing closely arranged rows of tiers of loaded pallets in a warehouse or the like and wherein said rack assemblies are of the type embodying parallel rows of rigid upright frames anchored rigidly in place and forming therebetween narrow storage aisles for tiers of loaded pallets; said improvements being characterized by the provision of a plurality of swing bars extending crosswise of the aisle at a level above an underlying loaded pallet and cooperating to support an upper loaded pallet directly thereon, said swing bars each having a notched end engageable with the upper side of a horizontally disposed portion of the frame on one side of the aisle and the other end having a loose pivotal connection with a horizontally disposed portion of the frame on the other side of the aisle and permitting the swing bars to be swung vertically and laterally as necessary to engage and disengage the notched end with the associated one of said frames while holding said bars captively assembled to the frame, and said swing bars lying substantially within the vertical plane of one of said frames when not in use to avoid interference with the use of the aisle.

4. A storage rack assembly as defined in claim 3 characterized in that the pivotally supported end of said swing bars includes a C-shaped notch therein opening downwardly when the swing bar is in its horizontal pallet-supporting position, and the opening to said notch being spaced inwardly from the end of the swing bar thereby permitting the swing bar to be disengaged from the rack frame only by lifting the swing bar and maneuvering the same as necessary to effect disassembly from said horizontally disposed portion of said frame.

5. In a storage room for loaded pallets, that improvement which comprises rack assemblies formed by rigid upright frames arranged parallel to one another to form aisles sufficiently wide to store a row of tiered loaded pallets, said aisles opening at their adjacent ends into a main access aisle, each of said frames having a rigid horizontal member extending from end-to-end thereof and projecting horizontally into said main aisle at a level above the normal working space used by workmen and pallet handling equipment, a plurality of swing bars having one end loosely but captively pivoted to said horizontal members about a generally horizontal axis and swingable from an inactive vertical suspension position below said horizontal members to a horizontal pallet supporting position with the free ends of said bars engaged over the horizontal member on the opposite side of the aisle, whereby loaded pallets may be stored in the upper portions of said aisle including the inner ends thereof overlying said main aisle without interference with the use of the space beneath said swing bar-supported pallets.

6. That improvement in pallet-storing rack assemblies defined in claim 5 characterized in that the pivotally supported ends of said swing bars are slidable through limited distances lengthwise of said horizontal members whereby the swing bars on the ends of the horizontal members projecting into said main aisle are shiftable to lie vertically along the side of the main aisle when not in use to support a pallet.

7. That improvement in pallet-storing rack assemblies defined in claim 5 characterized in that said rack frames are formed from tubular components including said horizontal member all lying substantially in a common vertical plane thereby to conserve the storage space occupied by said frames and to provide storage aisles between adjacent ones of said frames free of protuberances extending thereinto from the sides of said frames.

References Cited by the Examiner

UNITED STATES PATENTS

| | | | |
|---|---|---|---|
| 1,562,089 | 11/25 | Holley | 211—150 X |
| 1,729,181 | 9/29 | Neilson | 211—60 |
| 2,492,701 | 12/49 | Kirk | 211—100 |
| 2,506,640 | 5/50 | Hawes | 182—179 |
| 2,815,130 | 12/57 | Franks | 211—148 |
| 2,894,641 | 7/59 | Edwards | 211—148 |
| 2,895,619 | 7/59 | Frazier | 211—148 |
| 2,897,013 | 7/59 | Delp | 211—148 X |

FOREIGN PATENTS

| | | |
|---|---|---|
| 645,809 | 11/50 | Great Britain. |
| 1,218,839 | 12/59 | France. |

CLAUDE A. LE ROY, *Primary Examiner.*